US012117141B1

(12) United States Patent
Zheng

(10) Patent No.: US 12,117,141 B1
(45) Date of Patent: Oct. 15, 2024

(54) LED DOWNLIGHT

(71) Applicant: JOININ GLOBAL PTE.LTD., Singapore (SG)

(72) Inventor: Hongbing Zheng, Hangzhou (CN)

(73) Assignee: JOININ GLOBAL PTE. LTD. (SG)

( * ) Notice: Subject to any disclaimer, the term of this patent is extended or adjusted under 35 U.S.C. 154(b) by 0 days.

(21) Appl. No.: 18/434,854

(22) Filed: Feb. 7, 2024

(30) Foreign Application Priority Data

Apr. 17, 2023 (CN) ........................ 202320852249.X

(51) Int. Cl.

| | |
|---|---|
| ***F21S 8/00*** | (2006.01) |
| ***F21S 8/02*** | (2006.01) |
| ***F21V 23/04*** | (2006.01) |
| *F21Y 113/13* | (2016.01) |
| *F21Y 115/10* | (2016.01) |

(52) U.S. Cl.
CPC .............. *F21S 8/026* (2013.01); *F21V 23/04* (2013.01); *F21Y 2113/13* (2016.08); *F21Y 2115/10* (2016.08)

(58) Field of Classification Search
CPC ................................. F21S 8/026; F21V 23/04
See application file for complete search history.

(56) References Cited

U.S. PATENT DOCUMENTS

| | | | | |
|---|---|---|---|---|
| 11,761,597 | B1 * | 9/2023 | Zheng | F21S 8/026 362/235 |
| 2016/0258603 | A1 * | 9/2016 | Yokotani | F21V 5/04 |
| 2017/0343190 | A1 * | 11/2017 | Georgiev | F21V 19/0055 |
| 2019/0373699 | A1 * | 12/2019 | Chen | H05B 45/20 |

FOREIGN PATENT DOCUMENTS

JP 2024049680 A * 4/2024

* cited by examiner

*Primary Examiner* — Gerald J Sufleta, II
(74) *Attorney, Agent, or Firm* — IPRTOP LLC

(57) ABSTRACT

A LED downlight, including a lamp housing, a light source plate, and a mode adjustment device; the lamp housing includes a back cover and a surface ring, and the surface ring divides a holding space of the back cover into at least two independent cavities; the light source plate includes at least two groups of LED light sources with different color temperatures, each group of which is arranged in one of the at least two independent cavities; the mode adjustment device includes an adjustment switch and a driver arranged independently of the lamp housing, and the adjustment switch and the driver are connected in series before being electrically connected with the LED light sources. In this LED downlight design, the light sources housed in the main and secondary cavities operate independently without any interference. They can emit light either individually or in unison, offering a variety of lighting modes.

16 Claims, 5 Drawing Sheets

LED DOWNLIGHT

CROSS REFERENCE TO RELATED APPLICATION

The present application claims the benefit of priority to Chinese Patent Application No. 202320852249X, entitled "LED DOWNLIGHT", filed with CNIPA on Apr. 17, 2023, the disclosure of which is incorporated herein by reference in its entirety for all purposes.

FIELD OF THE INVENTION

The present disclosure generally relates to the technical field of lighting equipment, and particularly relates to an LED downlight.

BACKGROUND OF THE INVENTION

LED downlights are lighting fixtures hidden in the ceiling, casting light downwards. They have a wide range of market applications, and are a popular choice for many spaces, including ceilings of bedrooms, living rooms, and bathrooms, where they blend seamlessly with the interior decor. LED downlights can create a variety of lighting effects using different light sources, light-guiding plates, or diffusers. They're compact, yet effective in enhancing the visual appeal and depth of a room through their play of light and shadow.

As living rooms evolve to serve multiple purposes, the demand for versatile and high-quality lighting has grown. While there are LED downlights available in the market, many lack auxiliary lighting features and offer only basic lighting modes, which can limit the ambiance they create. Although these lights meet everyday lighting needs, they fall short in delivering an exceptional lighting experience for consumers.

SUMMARY OF THE INVENTION

The present disclosure provides an LED downlight that addresses the technical issue in related technology where the single lighting mode of LED downlights leads to a poor user experience.

The LED downlight includes a lamp housing, a light source plate, and a mode adjustment device; the lamp housing includes a back cover and a surface ring, wherein the surface ring is configured to divide a holding space of the back cover into at least two independent cavities; the light source plate includes at least two groups of LED light sources with different color temperatures, each group of which is arranged in one of the at least two independent cavities; the mode adjustment device includes an adjustment switch and a driver arranged independently of the lamp housing, and the adjustment switch and the driver are connected in series before being electrically connected with the LED light sources.

In an embodiment of the present disclosure, the adjustment switch is configured to output a control instruction to the driver; the driver is configured to switch light emission modes of the LED light sources based on the control instruction.

In an embodiment of the present disclosure, the driver has an internal control circuit.

In an embodiment of the present disclosure, the LED light sources have at least a first light emission mode, a second light emission mode, a third light emission mode, and a fourth light emission mode;

- in the first light emission mode, a main light emission surface emits light, and a secondary light emission surface emits no light;
- in the second light emission mode, the main light emission surface emits no light, and the secondary light emission surface emits light;
- in the third light emission mode, the main light emission surface and the secondary light emission surface both emit light, but color temperatures of the main light emission surface and the secondary light emission surface are different;
- in the fourth light emission mode, the main light emission surface and the secondary light emission surface both emit light, and the color temperatures of the main light emission surface and the secondary light emission surface are the same.

In an embodiment of the present disclosure, the LED light sources further include a connecting fastener, which is configured to extend through a first connecting hole on the back cover and a second connecting hole on the light source plate, to matingly connect to a connecting hole post on the surface ring.

In an embodiment of the present disclosure, the surface ring includes an annular baffle and a cylindrical baffle, and a lower edge of the cylindrical baffle abuts a light emission surface of the light source plate to divide the holding space of the back cover into the at least two independent cavities.

In an embodiment of the present disclosure, the surface ring is integrally formed through injection molding.

In an embodiment of the present disclosure, the independent cavities include a main cavity and at least one secondary cavity, and the secondary cavity is adjacent to the main cavity, and is further from a center of the back cover compared to the main cavity.

In an embodiment of the present disclosure, the annular baffle is perforated with patterned holes.

In an embodiment of the present disclosure, the annular baffle and the cylindrical baffle are made of an opaque material.

In an embodiment of the present disclosure, the lamp housing further includes a light-guiding ring and a light-transmitting cover; the light-guiding ring is disposed between the surface ring and the back cover, abutting the annular baffle, and extending outward, the light-transmitting cover is pressed against the surface ring and covers a center hole of the surface ring, and the light-transmitting cover is flush with or lower than the annular baffle when pressed against the surface ring.

In an embodiment of the present disclosure, the light-transmitting cover is a light emission surface of the main cavity.

In an embodiment of the present disclosure, the light-guiding ring is a light emission surface of the secondary cavity.

In an embodiment of the present disclosure, the light-guiding ring includes a light-guiding body in the shape of a horizontal T, and the light-guiding body includes an upper light-guiding face, a lower light-guiding face, and a side light-guiding face.

In an embodiment of the present disclosure, the light-guiding ring is made of a polymer material that diffusely reflects light.

In an embodiment of the present disclosure, the light-guiding ring is partially exposed by the back cover and the surface ring.

In an embodiment of the present disclosure, the back cover is made of a metal material.

As described above, the LED downlight of the present disclosure has the following beneficial effects:

(1) The light sources housed in the main and secondary cavities operate independently without any interference. They can emit light either individually or in unison, offering a variety of lighting modes. This versatility caters to the diverse needs of users across multiple scenarios, reducing the need for multiple fixtures in the same space.

(2) The LED downlight features auxiliary lighting, and the inclusion of a light-guiding ring adds a new dimension to the play of light and shadow, which not only enhances the ambiance of the space but also significantly improves the user experience.

(3) The installation process is simple and convenient, with a design that minimizes the risk of detachment, and the straight-down design also contributes to cost reduction by eliminating the need for light-guiding plates.

REFERENCE NUMERALS

Figure 1:
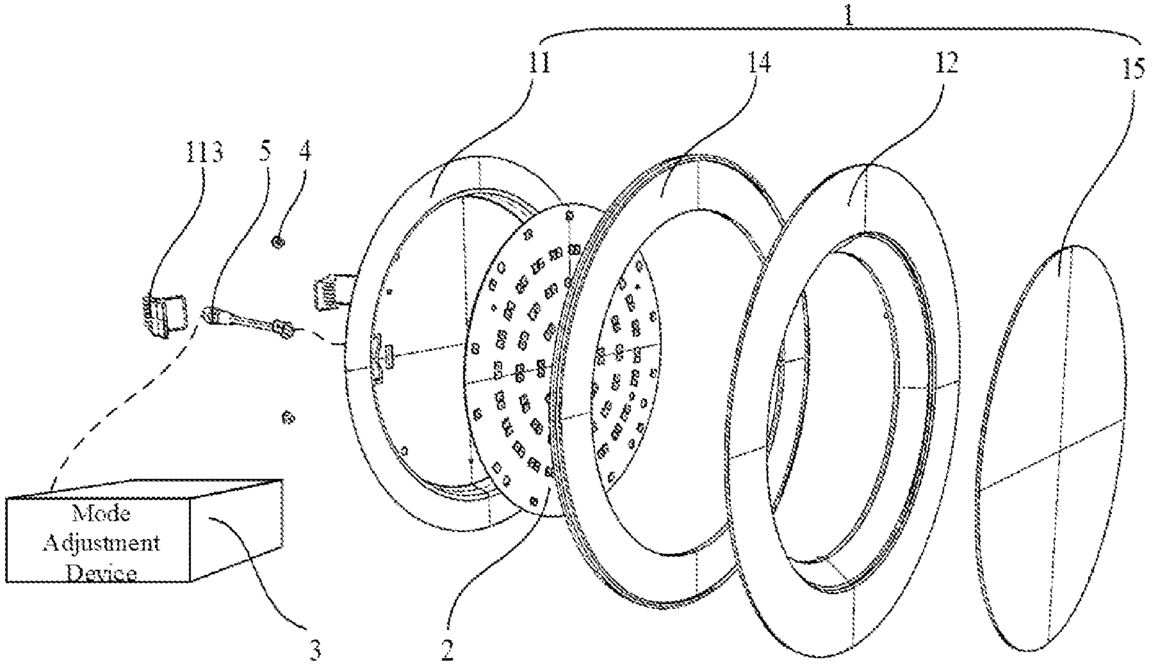
FIG. 1 shows an exploded view of an LED downlight according to an embodiment of the present disclosure.

1 Lamp housing
11 Back cover
111 First connecting hole
112 Cable via
113 Spring buckle
12 Surface ring
121 Annular baffle
122 Cylindrical baffle
123 Connecting hole post
13 Independent cavities
131 Main cavity
132 Secondary cavity

14 Light-guiding ring
141 Upper light-guiding face
142 Lower light-guiding face
143 Side light-guiding face
15 Light-transmitting cover
2 Light source plate
21 Inner light source area
211 LED1
212 LED2
22 Outer light source area
23 Boundary between the inner light source area and the outer light source area
24 Second connecting hole
3 Mode adjustment device
31 Adjustment switch
32 Driver
4 Connecting fastener
5 Wire

DETAILED DESCRIPTION

The embodiments of the present disclosure will be described below. Those skilled can easily understand disclosure advantages and effects of the present disclosure according to contents disclosed by the specification. The present disclosure can also be implemented or applied through other different specific embodiments. Various details in this specification can also be modified or changed based on different viewpoints and disclosures without departing from the spirit of the ring is present disclosure. It should be noted that the following embodiments and the features of the following embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape, and size of the components in actual implementation; during the actual implementation, the type, quantity, and proportion of each component can be changed as needed, and the layout of the components can also be more complicated.

In addition, terms like "first" and "second" are used for descriptive purpose only, and are not to be construed as indicating or implying relative importance or implicitly specifying numbers of technical features indicated. Thus, features qualified with terms like "first" and "second" may explicitly or implicitly include at least one such feature. Moreover, the technical solutions of various embodiments can be combined, provided they are feasible for someone with ordinary skills in this field. However, if the combination of technical solutions leads to contradictions or is unachievable, it should be understood that such a combination doesn't exist and is not within the scope of this disclosure.

The present disclosure provides an LED downlight that addresses the technical issue in related technology where the single lighting mode of LED downlights leads to a poor user experience. The principles and embodiments of the LED downlight will be described in detail below in conjunction with the accompanying drawings, so that those skilled in the art can understand the LED downlight without creative labor.

Refer to FIG. 1, which shows an exploded view of the LED downlight according to an embodiment of the present disclosure. As shown in FIG. 1, the LED downlight includes a lamp housing 1, a light source plate 2, and a mode adjustment device 3;

In one embodiment, the lamp housing 1 includes a back cover 11 and a surface ring 12, wherein the surface ring 12 divides a holding space of the back cover 11 into at least two independent cavities 13 (not shown in FIG. 1).

Figure 2:
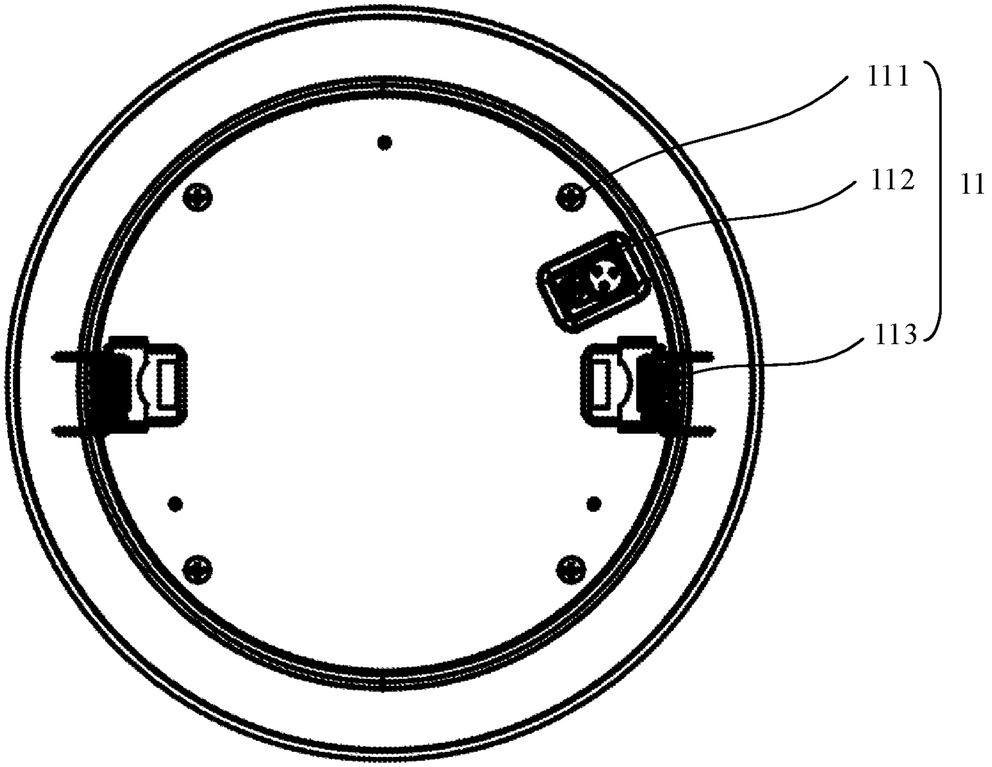
FIG. 2 shows a bottom view of a back cover of the LED downlight according to an embodiment of the present disclosure.

Refer to FIG. 2, which shows a bottom view of a back cover of the LED downlight according to an embodiment of the present disclosure. Herein, the bottom-to-top direction is a direction pointing from the back cover 11 to the surface ring 12. As shown in FIG. 2, the back cover 11 is the back cover of the entire downlight, and the back cover 11 includes a sink and an annular flange extending outwards from a top edge of the sink. The bottom of the sink has a first connecting hole 111 and a cable via 112, and the first connecting hole 111 is configured to cooperate with a connecting fastener 4 to fix the light source plate 2 to the bottom of the sink; the cable via 112 allows a wire 5 to pass through; one end of the wire 5 is connected to the light source plate 2, and the other end of the wire is connected to the mode adjustment device 3, thereby achieving communication between the light source plate 2 and an external control circuit. A pair of spring buckles 113 are provided on opposite sides at an outer bottom surface of the back cover 11, and the spring buckles 113 secure the LED downlight into holes in the ceiling, using an inverted hook style.

Preferably, the back cover 11 is provided with heat dissipation holes for dissipating heat generated by the light source plate 2.

Figure 3A:
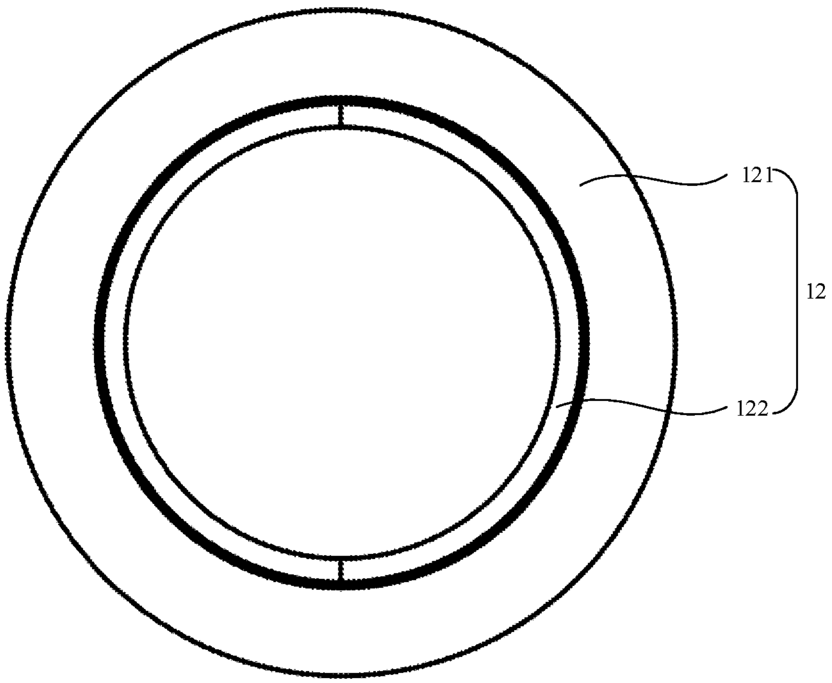
FIG. 3*a* shows a top view of a surface ring of the LED downlight according to an embodiment of the present disclosure.

Refer to FIG. 3*a*, which shows a top view of the surface ring of the LED downlight according to an embodiment of the present disclosure. As shown in FIG. 3*a*, the surface ring 12 is integrally formed through injection molding, and the surface ring 12 includes an annular baffle 121 and a cylindrical baffle 122. The cylindrical baffle 122 includes an upper opening and a lower opening, the lower opening has a diameter that is smaller than that of the upper opening, an edge of the upper opening is connected to an inner side surface of the annular baffle 121, and an edge of the lower opening abuts the light emission surface of the light source plate 2 to divide the holding space of the back cover 11 into the at least two independent cavities 13.

Figure 3B:
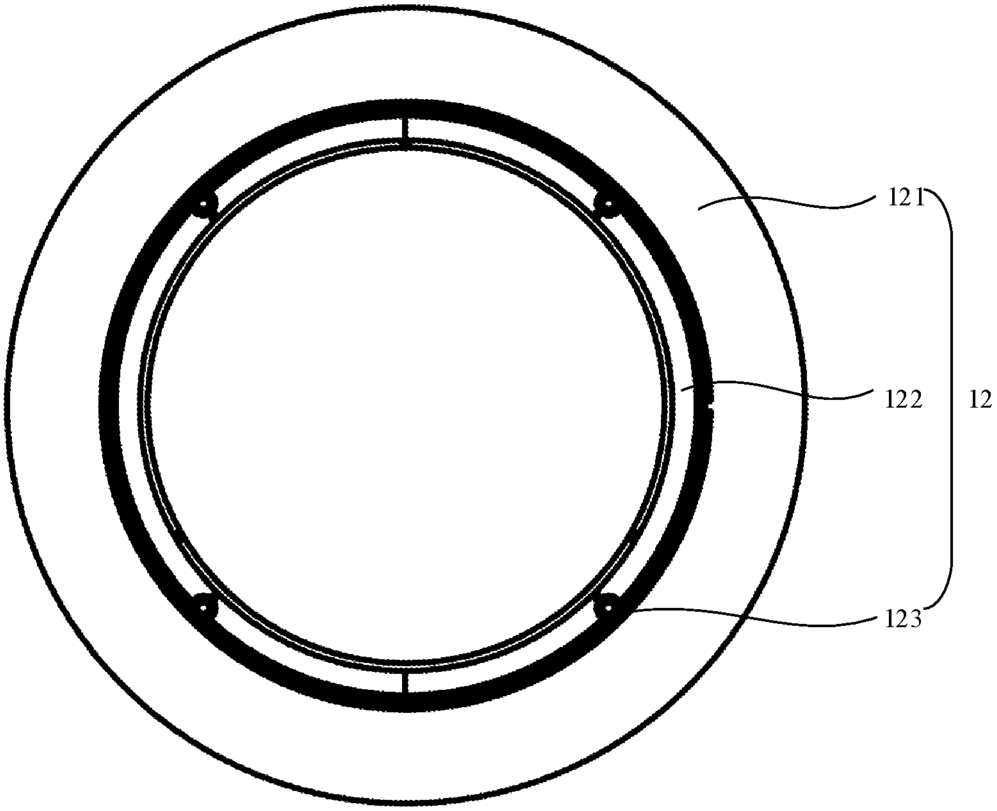
FIG. 3*b* shows a bottom view of the surface ring of the LED downlight according to an embodiment of the present disclosure.

Refer to FIG. 3*b*, which shows a bottom view of the surface ring of the LED downlight according to an embodiment of the present disclosure. As shown in FIG. 3*b*, the surface ring 12 is also provided with a connecting hole post 123 corresponding to the first connecting hole 111. The length of the connecting hole post 123 is less than or equal to the length of the cylindrical baffle 122, and the connecting hole post 123 abuts an outer side surface of the cylindrical baffle 122. It should be noted that the first connecting hole 111 corresponds to the connecting hole post 123, meaning that the two have an equal quantity and aligned positions.

Figure 4:
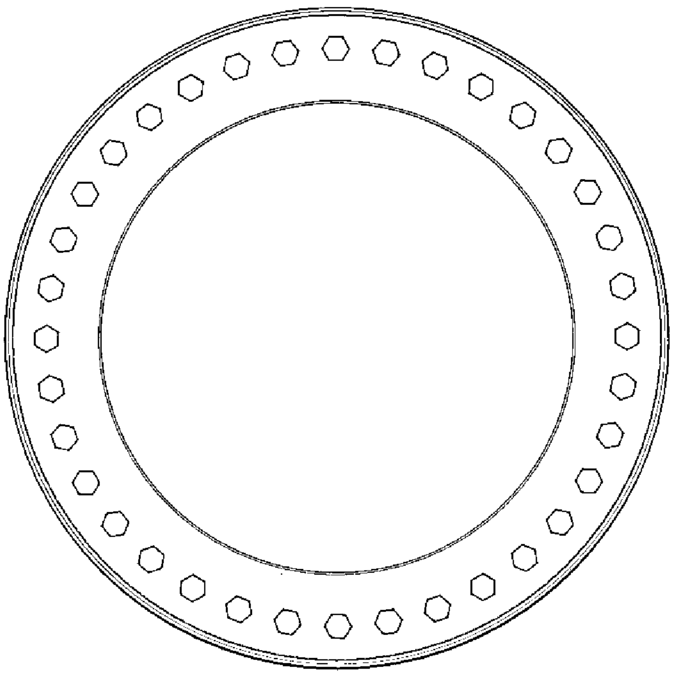
FIG. 4 shows a schematic structural diagram of an annular baffle of the LED downlight according to an embodiment of the present disclosure.

Preferably, the annular baffle 121 and the cylindrical baffle 122 are made of opaque materials to ensure that when the light disperses through the face ring 12, a broad and wide coverage is obtained, and it also helps to create a softer and more evenly distributed light. In other embodiments, the annular baffle 121 and the cylindrical baffle 122 of the surface ring 12 may also be of other shapes, as long as the surface ring has an isolation effect. In order to meet the different needs of users, a variety of processes may be further used to treat the surface of the surface ring 12, such as wire drawing, sanding, paint baking, etc., to enhance the texture of the surface ring 12. In one embodiment, the annular baffle 121 is perforated with patterned holes, which can effectively enhance the aesthetics of the downlight. Refer to FIG. 4, which shows a schematic structural diagram of the annular baffle of the LED downlight according to an embodiment of the present disclosure. As shown in FIG. 4, the patterned holes on the annular baffle are regular hexagons.

In an embodiment, the light source plate 2 is provided with at least two groups of LED light sources with different color temperatures, each group of which is arranged in one of the at least two independent cavities 13. In one embodiment, each LED light source refers to one LED bead.

Figure 5A:
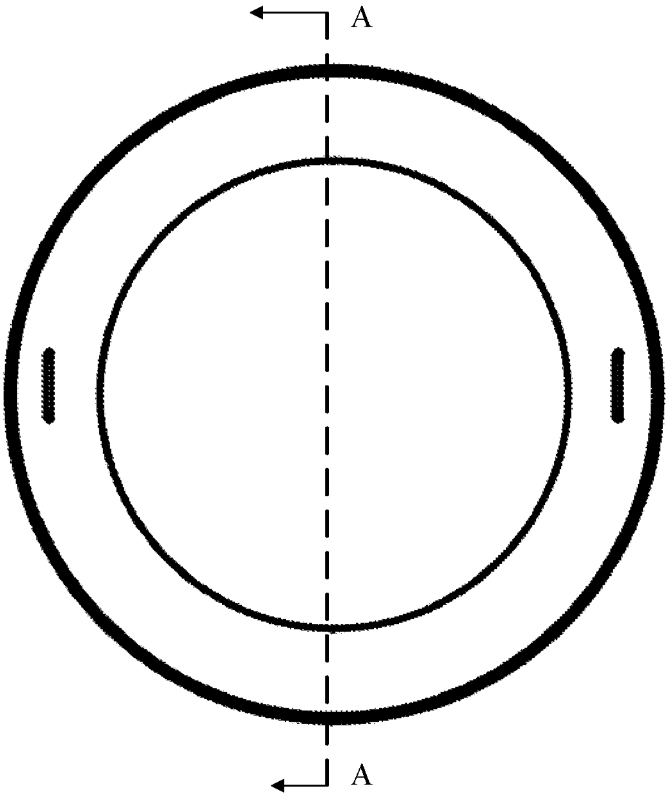
FIG. 5*a* shows a top view of the LED downlight according to an embodiment of the present disclosure.
Figure 5B:
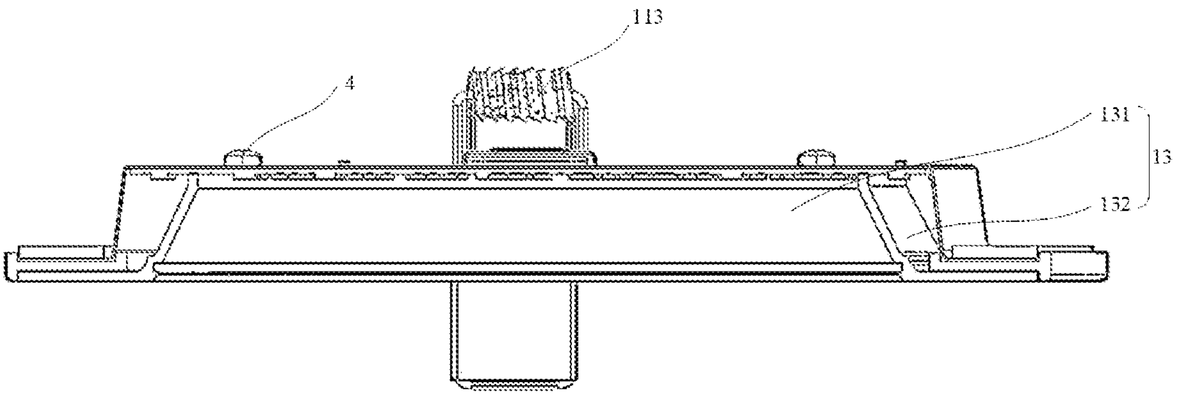
FIG. 5*b* shows a cross-sectional view of the LED downlight according to an embodiment of the present disclosure, with the cutting plane passing through A-A.

Refer to FIG. 5*a*, which shows a top view of the LED downlight according to an embodiment of the present disclosure. Refer to FIG. 5*b*, which shows a cross-sectional view of the LED downlight according to an embodiment of the present disclosure, with the cutting plane passing through A-A. As shown in FIGS. 5*a* and 5*b*, the independent cavities 13 include a main cavity 131 and at least one secondary cavity 132, wherein the secondary cavity 132 is adjacent to the main cavity 131, and is further from a center of the back cover 11 compared to the main cavity 131.

The light sources housed in the main cavity 131 and secondary cavity 132 operate independently without any interference. They can emit light either individually or in unison, offering a variety of lighting modes.

Figure 6:
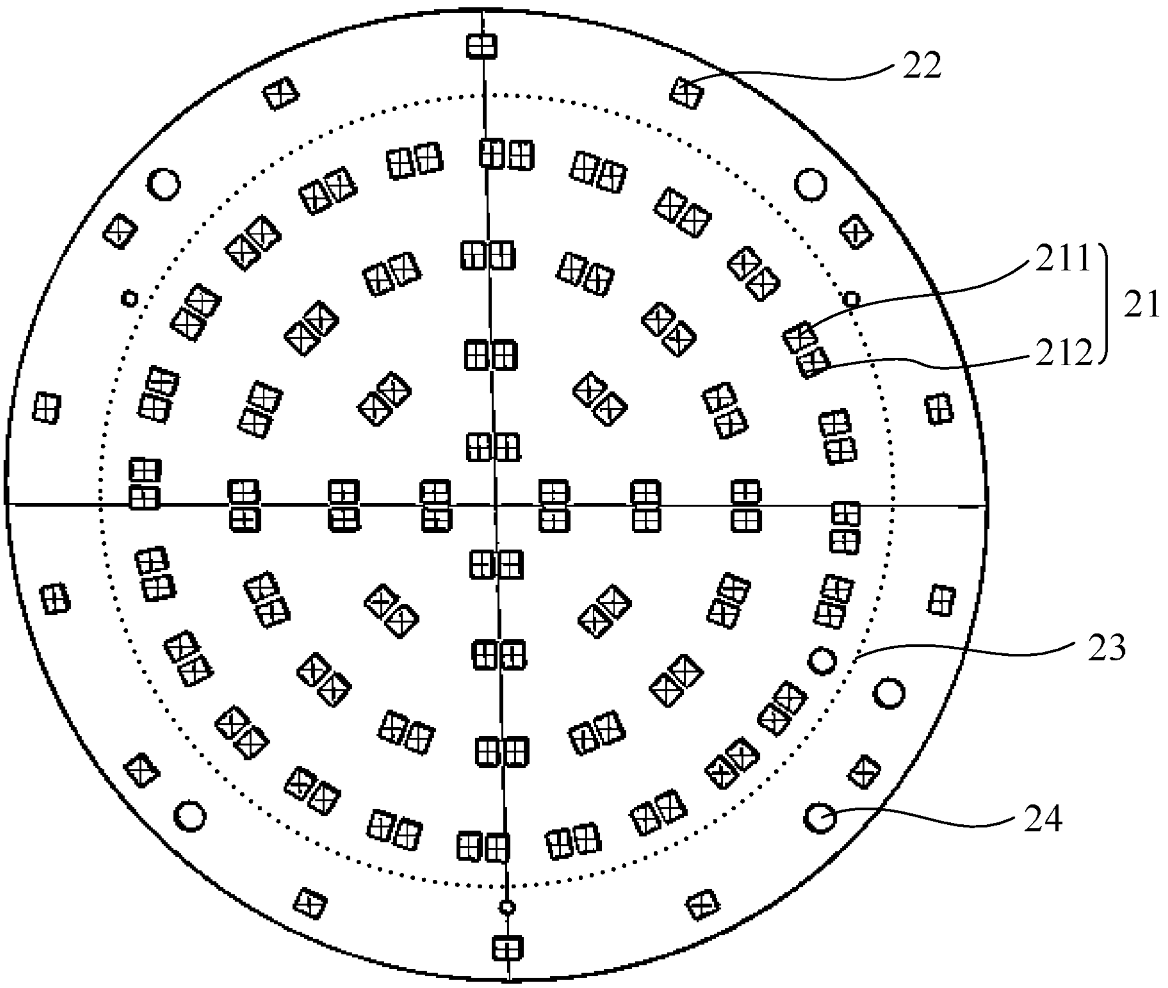
FIG. 6 shows a schematic structural diagram of a light source plate of the LED downlight according to an embodiment of the present disclosure.

Refer to FIG. 6, which shows a schematic structural diagram of the light source plate of the LED downlight according to an embodiment of the present disclosure. Preferably, the light source plate 2 includes a high-voltage circuit board with a high thermal conductivity. As shown in FIG. 6, the light emission surface of the light source plate 2 includes an inner light source area 21 and an outer light source area 22, corresponding to the at least two independent cavities 13. The inner light source area 21 emits light through a main light emission surface, and the outer light source area 22 emits light through a secondary light emission surface. The dotted line in FIG. 6 represents the boundary 23 between the inner light source area 21 and the outer light source area 22. The back side of the light source plate 2 is provided with a tin-solder wire terminal (not shown) that is electrically connected to the wire 5 passing through the cable via 112. It should be noted that the independent cavities 13 correspond to the inner light source area 21 and the outer light source area 22, meaning that the quantity of the main cavity 131 and the inner light source area 21 are the same, the positions of the main cavity 131 and the inner light source area 21 are aligned, the quantity of the secondary cavity 132 and the outer light source area 22 are the same, and when installed, the positions of the secondary cavity 132 and the outer light source area 22 are aligned.

The inner light source area 21 and the outer light source area 22 are respectively provided with LED beads arranged in concentric circles; the inner light source area 21 is provided with four circles of LED beads, each circle of which includes several pairs of LED1 211 and LED2 212, where the pairs are equidistantly distributed; each LED2 212 is immediately adjacent to the LED1 211 of the same pair; under the driving control of the mode adjustment device 3, LED1 211 and LED2 212 of the same pair can emit light separately, with different color temperatures. The outer light source area 22 is provided with one circle of LED beads LED3, which are equidistantly distributed, and the color temperature of LED3 is equal to that of either LED1 211 or LED2 212.

The number of LED beads in the inner light source area 21 and the number of LED beads in the outer light source area 22 may be adjusted according to the actual application scenario. The LED beads in the inner light source area 21 and the outer light source area 22 may be arranged in various ways. For example, the outer light source area 22 may also be provided with several pairs of LED1 211 and LED2 212, where the pairs are equidistantly distributed, each LED2 212 is immediately adjacent to the LED1 211 of the same pair, and under the driving control of the mode adjustment device 3, LED1 211 and LED2 212 of the same pair can emit light separately, with different color temperatures. Other combinations of LED beads that can achieve similar effects may also be adopted.

The outer light source area 22 is further provided with a second connecting hole 24 corresponding to the first connecting hole 111 and the connecting hole post 123. The second connecting hole 24 is provided in a gap between two adjacent LED3 beads in the outer light source area 22. It should be noted that the second connecting hole 24 corresponds to the first connecting hole 111 and the connecting hole post 123, meaning that the quantity of the second connecting hole 24 is the same as that of the first connecting hole 111, and that of the connecting hole post 123, and when installed, the position of the second connecting hole 24 is aligned with that of the first connecting hole 111, and that of the connecting hole post 123. Note, there are can be more than one first connecting holes, second connecting holes, and connecting hole posts.

Herein, the LED beads are evenly arranged in both the inner light source area 21 and the outer light source area 22, thereby ensuring the uniform emission of light from both the main light emission surface and the secondary light emission surface.

In one embodiment, the LED light sources have at least a first light emission mode, a second light emission mode, a third light emission mode, and a fourth light emission mode.

In the first light emission mode, the main light emission surface emits light, and the secondary light emission surface emits no light.

In the second light emission mode, the main light emission surface emits no light, and the secondary light emission surface emits light.

In the third light emission mode, the main light emission surface and the secondary light emission surface both emit light, but color temperatures of the main light emission surface and the secondary light emission surface are different.

In the fourth light emission mode, the main light emission surface and the secondary light emission surface both emit light, and the color temperatures of the main light emission surface and the secondary light emission surface are the same.

It should be noted that, in terms of color temperatures, light emitted by the LED light sources in the present disclosure may be categorized into different types that include, but are not limited to, warm color light (3000K), cold color light (6500K), and mixed color light (3000K~6500K), wherein the mixed color light can be any tone of light between warm color light and cold color light.

Herein, a variety of light emission modes are provided, which caters to the diverse needs of users across multiple scenarios, reducing the need for multiple lighting fixtures in the same space.

Figure 7:
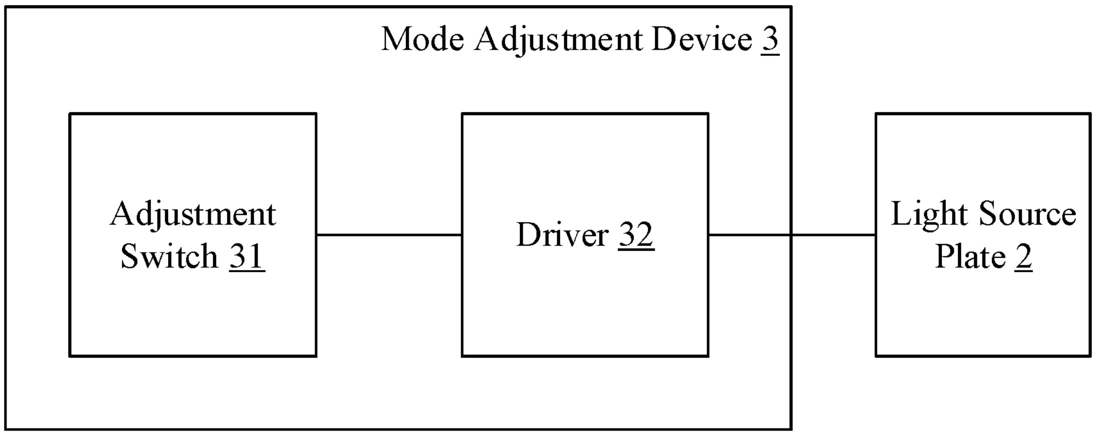
FIG. 7 shows a schematic structural diagram of a mode adjustment device of the LED downlight according to an embodiment of the present disclosure.

Refer to FIG. 7, which shows a schematic structural diagram of the mode adjustment device of the LED downlight according to an embodiment of the present disclosure. As shown in FIG. 7, the mode adjustment device 3 includes an adjustment switch 31 and a driver 32 arranged independently of the lamp housing 1, and the adjustment switch 31 and the driver 32 are connected in series before being electrically connected to the LED light sources.

In one embodiment, the adjustment switch 31 of the present disclosure may employ a dial switch for outputting multiple sets of 0/1 codes, with each set of 0/1 codes being a control instruction and corresponding to one light emission mode of the LED light sources. For example, when an 8-bit dial switch is employed, the dial switch has a total of 16 dialing addresses such as 0000, 0001, . . . , 1110, and 1111, of which 0000 may be used as the code for the first light emission mode, 0001 may used as the code for the second light emission mode, 0010 may be used as the code for the third light emission mode, and 0011 may be used as the code for the fourth light emission mode. The adjustment switch 31 outputs the control instruction to the driver 32.

It should be noted that the position of the adjustment switch 31 may vary, as long as the control circuit in the driver 32 can achieve on-off control of the light sources.

Figure 8:
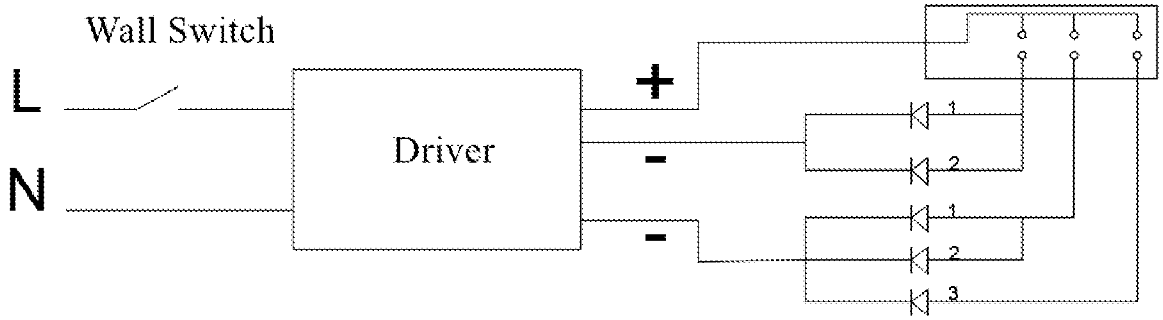
FIG. 8 shows a schematic circuit diagram of the mode adjustment device of the LED downlight according to an embodiment of the present disclosure.

Refer to FIG. 8, which shows a schematic circuit diagram of the mode adjustment device of the LED downlight according to an embodiment of the present disclosure. FIG. 8 corresponds to the principle shown in FIG. 7. The driver 32 has an internal control circuit. The driver 32 may be any one of a microcontroller, a digital signal processor (DSP), and a field programmable gate array (FPGA), and switches light emission modes of the LED light sources based on the control instruction.

Further, the mode adjustment device may also control illumination directions of the LED light sources.

In an embodiment, the LED downlight of the present disclosure further includes a connecting fastener 4, which extends through the first connecting hole 111 on the back cover 11, and the second connecting hole 24 on the light source plate 2, and is matingly connected to the connecting hole post 123 on the surface ring 12.

Preferably, the connecting fastener 4 includes a self-tapping screw for screwing directly into the connecting hole post 123 after extending through the first connecting hole 111 on the back cover 11 and the second connecting hole 24 on the light source plate 2. In other embodiments, the connecting fastener 4 may also include a universal screw, and correspondingly a thread fitting the universal screw may be provided on the inner wall of the connecting hole post 123 for secure connection.

Herein, the installation process is simple and convenient, with a design that minimizes the risk of detachment, and the straight-down design also contributes to cost reduction by eliminating the need for light-guiding plates.

In one embodiment, the lamp housing 1 further includes a light-guiding ring 14 and a light-transmitting cover 15.

The light-guiding ring 14 is the light emission surface of the secondary cavity 132, it is disposed between the surface ring 12 and the back cover 11, abutting the annular baffle 121 while extending outward, and it is partially exposed by the back cover 11 and the surface ring 12.

Figure 9:
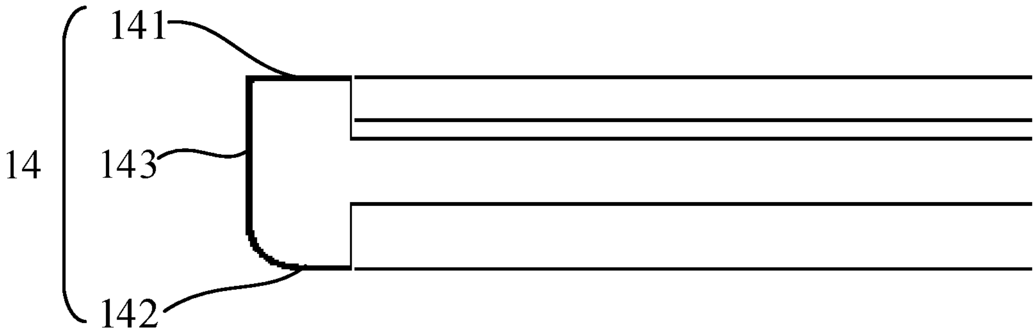
FIG. 9 shows a partial cross-sectional view of a light-guiding ring of the LED downlight according to an embodiment of the present disclosure.

Refer to FIG. 9, which shows a partial cross-sectional view of the light-guiding ring of the LED downlight according to an embodiment of the present disclosure. As shown in FIG. 9, the light-guiding ring 14 includes a light-guiding body in the shape of a horizontal T, and the extension part of the light-guiding body includes an upper light-guiding face 141, a lower light-guiding face 142, and a side light-guiding face 143. Light emitted from the secondary cavity 132 enters the light-guiding body from an inner face of the light-guiding ring 14 (for example, a face of the light-guiding body close to the secondary cavity 132) and is transmitted within the light-guiding body to reach the extension part and exits from the upper light-guiding face 141, the lower light-guiding surface 142, and/or the side light-guiding surface 143. In one embodiment, the extension part of the light-guiding body is partially exposed by the back cover 11 and the surface ring 12, and light transmitted to the upper light-guiding face 141 further goes through and emits from the patterned holes in the annular baffle 121 of the surface ring 12.

Herein, the LED downlight features auxiliary lighting, and the inclusion of the light-guiding ring adds a new dimension to the play of light and shadow, which not only enhances the ambiance of the space but also significantly improves the user experience.

The light-transmitting cover 15 is the light emission surface of the main cavity 131. The light-transmitting cover 15 is configured to be pressed against the surface ring 12 and cover an upper opening of the cylindrical baffle 122, and the light-transmitting cover 15 is flush with or lower than the annular baffle 121 when pressed against the surface ring 12.

Preferably, the back cover 11 is made of a metal material, and is made by a stamping process.

Preferably, the light-guiding ring 14 is made of a polymer material that diffusely reflects light, and the surface ring 12 is made of a polymer material.

An exemplary mode switching process of the LED downlight of the present disclosure is as follows:

When the driver 32 is initially powered on, the first light emission mode of the LED light source is first activated, where the main light emission surface emits light, and the secondary light emission surface emits no light. When the adjustment switch 31 turns the power off, the driver 32 receives a power-off signal from the adjustment switch 31 and prepares for mode switching. After the adjustment switch 31 turns the power back on, the second light emission mode is then activated, where the main light emission surface emits no light and the secondary light emission surface emits light. Similarly, after powering off and on for one more time, the third light emission mode is activated, where the main light emission surface and the secondary light emission surface both emit light, but the color temperatures of the main light emission surface and the secondary light emission surface are different. After powering off and on for yet one more time, the fourth light emission mode is activated, where the main light emission surface and the secondary light emission surface both emit light, and the color temperatures of the main light emission surface and the secondary light emission surface are the same. After powering off and on for another time, the first light emission mode is again activated. So on and so forth. In one embodiment, different color temperatures refers to color temperatures that are of different types (e.g., warm, cold, or mixed), and when two color temperatures are the same, it means that they are of the same type (e.g., warm, cold, or mixed). At the same time, the duration for which the adjustment switch 31 turns the power off needs to be controlled within a preset duration; for example, the preset duration is 2 seconds, and if the actual duration exceeds 2 seconds, the control circuit will be powered off, and the driver 32 will be restarted, at which time the first light emission mode is activated. Herein, the operation is simple and quick, which effectively improves the user experience.

The scope of the mode switching process of the LED downlight as described in the present disclosure is not limited to the sequence of operations listed above. Any scheme realized by adding or subtracting operations or replacing operations of the traditional techniques according to the principle of the present disclosure is included in the scope of the present disclosure.

The descriptions of the processes or structures corresponding to the various figures may emphasize different aspects. Parts not detailed in a particular process or structure can be referenced in the descriptions of other relevant processes or structures.

In summary, the present disclosure provides an LED downlight that addresses the technical issue in related technology where the single lighting mode of LED downlights leads to a poor user experience. The light sources housed in the main and secondary cavities operate independently without any interference. They can emit light either individually or in unison, offering a variety of lighting modes. This versatility caters to the diverse needs of users across multiple scenarios, reducing the need for multiple fixtures in the same space. The downlight also features an auxiliary lighting function, adding depth to the play of light and shadow, enhancing the ambiance of the space, and ultimately improving the user experience. The installation process is simple and convenient, with a design that minimizes the risk of detachment.

The above-mentioned embodiments are merely illustrative of the principle and effects of the present disclosure instead of restricting the scope of the present disclosure. Any person skilled in the art may modify or change the above embodiments without violating the principle of the present disclosure. Therefore, all equivalent modifications or changes made by those who have common knowledge in the art without departing from the spirit and technical concept disclosed by the present disclosure shall be still covered by the claims of the present disclosure.

The invention claimed is:

1. An LED downlight, comprising:

a lamp housing, wherein the lamp housing comprises a back cover and a surface ring, wherein the surface ring is configured to divide a holding space of the back cover into at least two independent cavities;

a light source plate, wherein the light source plate comprises at least two groups of LED light sources with different color temperatures, each group of which is arranged in one of the at least two independent cavities;

a mode adjustment device, wherein the mode adjustment device comprises an adjustment switch and a driver arranged independently of the lamp housing, and the adjustment switch and the driver are connected in series before being electrically connected with the LED light sources; and a connecting fastener, which is configured to extend through a first connecting hole on the back cover and a second connecting hole on the light source plate, to matingly connect to a connecting hole post on the surface ring.

2. The LED downlight according to claim 1, wherein the adjustment switch is configured to output a control instruction to the driver, and the driver is configured to switch light emission modes of the LED light sources based on the control instruction.

3. The LED downlight according to claim 1, wherein the driver comprises an internal control circuit.

4. The LED downlight according to claim 1, wherein the light emission modes of the LED light sources comprise at least a first light emission mode, a second light emission mode, a third light emission mode and a fourth light emission mode;

wherein in the first light emission mode, a main light emission surface emits light, and a secondary light emission surface emits no light;

wherein in the second light emission mode, the main light emission surface emits no light, and the secondary light emission surface emits light;

wherein in the third light emission mode, the main light emission surface and the secondary light emission surface both emit light, but color temperatures of the main light emission surface and the secondary light emission surface are different;

wherein in the fourth light emission mode, the main light emission surface and the secondary light emission surface both emit light, and the color temperatures of the main light emission surface and the secondary light emission surface are the same.

5. The LED downlight according to claim 1, wherein the surface ring comprises an annular baffle and a cylindrical baffle, and a lower edge of the cylindrical baffle abuts a light emission surface of the light source plate to divide the holding space of the back cover into the at least two independent cavities.

6. The LED downlight according to claim 1, wherein the surface ring is integrally formed through injection molding.

7. The LED downlight according to claim 1, wherein the independent cavities comprise a main cavity and at least one secondary cavity, and the secondary cavity is adjacent to the main cavity, and is further from a center of the back cover compared to the main cavity.

8. The LED downlight according to claim 5, wherein the annular baffle is perforated with patterned holes.

9. The LED downlight according to claim 5, wherein the annular baffle and the cylindrical baffle are made of opaque materials.

10. The LED downlight according to claim 1, wherein the lamp housing further comprises a light-guiding ring and a light-transmitting cover, wherein the light-guiding ring is disposed between the surface ring and the back cover, abutting the annular baffle, and extending outward, wherein the light-transmitting cover is pressed against the surface ring and covers a center hole of the surface ring, and the light-transmitting cover is flush with or lower than the annular baffle when pressed against the surface ring.

11. The LED downlight according to claim 10, wherein the light-transmitting cover is a light emission surface of the main cavity.

12. The LED downlight according to claim 10, wherein the light-guiding ring is a light emission surface of the secondary cavity.

13. The LED downlight according to claim 10, wherein the light-guiding ring comprises a light-guiding body in the shape of a horizontal T, and the light-guiding body comprises an upper light-guiding face, a lower light-guiding face, and a side light-guiding face.

14. The LED downlight according to claim 10, wherein the light-guiding ring is made of a polymer material that diffusely reflects light.

15. The LED downlight according to claim 10, wherein the light-guiding ring is partially exposed by the back cover and the surface ring.

16. The LED downlight according to claim 1, wherein the back cover is made of a metal material.

* * * * *